(12) United States Patent
Lee

(10) Patent No.: US 10,991,970 B2
(45) Date of Patent: Apr. 27, 2021

(54) SECONDARY BATTERY MANUFACTURING SYSTEM FOR SIMPLIFYING PROCESS OF MANUFACTURING UNIT CELLS BY LAMINATING AND PROCESS OF FORMING ELECTRODE ASSEMBLY USING UNIT CELLS

(71) Applicant: Sora Lee, Seongnam-si (KR)

(72) Inventor: Jun Chul Lee, Seongnam-si (KR)

(73) Assignee: Sora Lee, Seongnam-si (KR)

( * ) Notice: Subject to any disclaimer, the term of this patent is extended or adjusted under 35 U.S.C. 154(b) by 0 days.

(21) Appl. No.: 17/035,306

(22) Filed: Sep. 28, 2020

(65) Prior Publication Data

US 2021/0098817 A1 Apr. 1, 2021

(30) Foreign Application Priority Data

Sep. 30, 2019 (KR) ........................ 10-2019-0120875

(51) Int. Cl.
| | |
|---|---|
| *H01M 10/04* | (2006.01) |
| *H01M 10/0585* | (2010.01) |
| *H01M 4/04* | (2006.01) |
| *H01M 10/28* | (2006.01) |

(52) U.S. Cl.
CPC ...... *H01M 10/0468* (2013.01); *H01M 4/0447* (2013.01); *H01M 10/0404* (2013.01); *H01M 10/0481* (2013.01); *H01M 10/0585* (2013.01); *H01M 10/281* (2013.01)

(58) Field of Classification Search
CPC ......... H01M 10/0404; H01M 10/0585; H01M 4/0447; H01M 10/0468; H01M 10/0481; H01M 10/281
See application file for complete search history.

(56) References Cited

U.S. PATENT DOCUMENTS

2014/0373343 A1* 12/2014 Park .................... H01M 2/1673
29/623.4
2016/0149254 A1* 5/2016 Ban .................... H01M 10/0585
29/623.3

FOREIGN PATENT DOCUMENTS

| KR | 10-2015-0037089 A | 4/2015 |
|---|---|---|
| KR | 10-2016-0094182 A | 8/2016 |
| KR | 10-1837724 B1 | 3/2018 |

* cited by examiner

*Primary Examiner* — Lingwen R Zeng
(74) *Attorney, Agent, or Firm* — Novick, Kim & Lee, PLLC; Sang Ho Lee

(57) ABSTRACT

Provided is a secondary battery manufacturing system which includes: a unit cell forming device for the forming unit cells, in which a separator, an anode cell, a separator, a cathode cell, and a separator are stacked in order, from a separator roll, an anode cell roll, and a cathode cell roll, which are rolled; an inverting device for forming inverted unit cells, in which a separator, a cathode cell, a separator, an anode cell, and a separator are stacked in order, by inverting some of two or more unit cells formed by the unit cell forming device; and a stacking device for stacking a unit cell, an anode cell, an inverted unit cell, and a cathode cell in order, in which the process of manufacturing an electrode assembly is simplified, and the defect rate of the manufactured electrode assembly is lowered.

20 Claims, 14 Drawing Sheets

SECONDARY BATTERY MANUFACTURING SYSTEM FOR SIMPLIFYING PROCESS OF MANUFACTURING UNIT CELLS BY LAMINATING AND PROCESS OF FORMING ELECTRODE ASSEMBLY USING UNIT CELLS

BACKGROUND OF THE INVENTION

Field of the Invention

The present invention relates to a secondary battery manufacturing system for simplifying a process of manufacturing unit cells by laminating and a process of forming an electrode assembly using the unit cells, and more specifically, to a secondary battery manufacturing system for simplifying a process of manufacturing unit cells by laminating and a process of forming an electrode assembly using the unit cells, which makes it easy to manufacture the unit cells by laminating and manufacture the electrode assembly by alternately stacking the unit cells and inverted unit cells.

Background of the Related Art

Rechargeable secondary batteries are widely used as an energy source of a mobile device. In addition, the secondary batteries are used as an energy storage means of an electric vehicle or the like, which is proposed as a solution for solving the problem of exhaustion gas of internal combustion engines and the problem of fossil fuel depletion.

The secondary batteries are classified into a cylindrical cell, a prismatic cell, and a pouch cell according to external and internal structural features.

An electrode assembly of a structure including a cathode, a separator, and an anode constituting a secondary battery is largely classified as a jelly-roll type (rolling type) or a stack type (stacking type) according to its structure. The jelly-roll type electrode assembly is manufactured by coating, drying and pressing an electrode active material or the like on a metal foil used as a current collector, tailoring the metal foil in the form of a band having a desired width and length, separating the anode from the cathode using a separator, and rolling the metal foil in a spiral form.

Although a jelly-roll type electrode assembly may be preferably used in a cylindrical battery, when it is applied to a prismatic or pouch type battery, the electrode active material is peeled off as the stress is locally concentrated, or deformation of the battery is induced due to the contraction and expansion phenomenon repeated in the charge and discharge process.

On the other hand, a stack type electrode assembly is a structure sequentially stacking a plurality of cathode and anode unit cells, and has an advantage of easily obtaining a prismatic shape. However, it is a disadvantage in that the manufacturing process is complicated, and when an impact is applied, the electrode is pushed, and a short circuit occurs.

To solve this problem, some of prior art techniques have proposed a stack and folding type electrode assembly, which has a structure folding a full cell having a structure of a cathode, a separator and an anode or a bicell having a structure of a cathode (anode), a separator, an anode (cathode), a separator, and a cathode (anode) using a long continuous separation film, as a hybrid electrode assembly combining the jelly-roll type and stack type electrode assemblies.

However, the stack and folding type electrode assembly is disadvantageous in that an internal space or system for the manufacturing process of arranging unit cells in a long sheet-type separator one by one and folding the unit cells and the separator by holding both ends are essentially required, and the process is very complicated, and as a result, the facility investment cost is high. Furthermore, as the number of unit cells increases, the unit cells are difficult to roll as they are arranged in a row, and thus, the defect rate of the electrode assembly may increase.

SUMMARY OF THE INVENTION

Therefore, the present invention has been made in view of the above problems, and it is an object of the present invention to provide a secondary battery manufacturing system for simplifying a process of manufacturing unit cells by laminating and a process of forming an electrode assembly using the unit cells, which can lower the defect rate of the manufactured electrode assembly and can be used for manufacturing the electrode assembly.

To accomplish the above object, according to one aspect of the present invention, there is provided a secondary battery manufacturing system for simplifying a process of manufacturing unit cells by laminating and a process of forming an electrode assembly using the unit cells, the system comprising: a unit cell forming device for the forming unit cells, in which a separator, an anode cell, a separator, a cathode cell, and a separator are stacked in order, from a separator roll, an anode cell roll, and a cathode cell roll, which are rolled; an inverting device for forming inverted unit cells, in which a separator, a cathode cell, a separator, an anode cell, and a separator are stacked in order, by inverting some of two or more unit cells formed by the unit cell forming device; and a stacking device for stacking a unit cell, an anode cell, an inverted unit cell, and a cathode cell in order, wherein the unit cell forming device forms the unit cells by stacking and integrating a separator, an anode cell, and a separator in order, and then stacking and integrating a cathode cell and a separator thereon.

To accomplish the above object, according to one aspect of the present invention, there is provided a secondary battery manufacturing system for simplifying a process of manufacturing unit cells by laminating and a process of forming an electrode assembly using the unit cells, the system comprising: a unit cell forming device for the forming unit cells, in which a separator, an anode cell, a separator, a cathode cell, and a separator are stacked in order, from a separator roll, an anode cell roll, and a cathode cell roll, which are rolled; an inverting device for forming inverted unit cells, in which a separator, a cathode cell, a separator, an anode cell, and a separator are stacked in order, by inverting some of two or more unit cells formed by the unit cell forming device; and a stacking device for stacking a unit cell, an anode cell, an inverted unit cell, and a cathode cell in order, wherein the unit cell forming device forms the unit cells by stacking and integrating a separator, a cathode cell, and a separator in order, and then stacking and integrating an anode cell and a separator below.

In addition, the unit cell forming device may include: guides for guiding the separator, the anode cell and the cathode cell unrolled from the separator roll, the anode cell roll, and the cathode cell roll to be overlapped; an anode cell cutter for forming unit anode cells by dividing the anode cell in a unit size, and cutting the anode cell to be arranged at appropriate intervals; a cathode cell cutter for forming unit cathode cells by dividing the cathode cell in a unit size, and cutting the cathode cell to be arranged at appropriate intervals; a first laminator and a second laminator for stacking and integrating the separator, the unit anode cells arranged at appropriate intervals, the separator, the unit cathode cells arranged at appropriate intervals, and the separator in order; and a unit cell cutter for cutting the separator, the unit anode cells arranged at appropriate intervals, the separator, the unit cathode cells arranged at appropriate intervals, and the separator integrated by the first laminator and the second laminator in a unit cell size.

In addition, an idle roller for guiding the integrated separator, unit anode cells arranged at appropriate intervals, separator, unit cathode cells arranged at appropriate intervals, and separator from the second laminator to the unit cell cutter may be located between the second laminator and the unit cell cutter.

In addition, the inverting device may include: a conveyor belt continuously supplied with the unit cells; an adsorption drum located on the top surface of the conveyor belt to adsorb the unit cells; a table located at one side on the top of the adsorption drum to receive the unit cells from the adsorption drum in an inverted state; and an upper carrier for receiving and moving the inverted unit cells from the table to magazines.

In addition, a suction unit having one or more suction holes formed in the longitudinal direction parallel to the rotation shaft of the adsorption drum may be formed on the circumferential surface of the adsorption drum.

In addition, the table may be provided with a block for limiting the position of the unit cell on the top surface of the table as the block contacts with an end portion of the unit cell.

In addition, the upper carrier may include: a body unit parallel to the rotation shaft of the adsorption drum and located on the table to reciprocate in the longitudinal direction; and a first adsorption unit and a second adsorption unit disposed on both longitudinal sides of the body unit.

In addition, when the body unit reciprocates in the longitudinal direction, any one of the first adsorption unit and the second adsorption unit may adsorb the inverted unit cell positioned on the table, and another one of the first adsorption unit and the second adsorption unit may transfer the inverted unit cell to the magazine.

In addition, the stacking device may include: a floor for preparing the unit cell at a first position, the anode cell at a second position to face the unit cell, the inverted unit cell at a third position, and the cathode cell at a fourth position to face the inverted unit cell; a stage reciprocating between the unit cell and the anode cell and between the inverted unit cell and the cathode cell; and one or more robot arms for stacking a unit cell, an anode cell, an inverted unit cell, and a cathode cell prepared at the first position to the fourth position in order on the stage.

In addition, the stage may be alternately tilted at a predetermined angle toward the first position, the second position, the third position, and the fourth position.

In addition, the first position and the third position may be located on one side of a path along which the stage moves, and the second position and the fourth position are located on the other side of the path along which the stage moves.

In addition, the robot arms may be positioned between the first position and the third position and between the second position and the fourth position, respectively.

DESCRIPTION OF SYMBOLS

1000: Unit cell forming device
1100: Guide
1200: Anode cell cutter
1300: Cathode cell cutter
1401: First laminator
1402: Second laminator
1500: Unit cell cutter
1600: Idle roller
2000: Inverting device
2100: Conveyor belt
2200: Adsorption drum
2210: Suction unit
2211: Suction hole
2300: Table
2310: Block
2400: Upper carrier
2410: Body unit
2420: First adsorption unit
2430: Second adsorption unit
M1: Magazine
M2: Magazine
3000: Stacking device
3100: Floor
3110: Path
3200: Stage
3210: Body unit
3211: Wheel
3212: Tilting seat unit
3213: Hinge
3214: Guide
3215: Clamping unit
3300: Robot arm
P1: First position
P2: Second position
P3: Third position
P4: Fourth position
R1: Separator roll
R2: Anode cell roll
R3: Cathode cell roller
U1: Unit cell U2: Inverted unit cell
NC: Anode cell
PC: Cathode cell

DETAILED DESCRIPTION OF THE PREFERRED EMBODIMENT

Hereafter, a secondary battery manufacturing system for simplifying a process of manufacturing unit cells by laminating and a process of forming an electrode assembly using the unit cells according to an embodiment of the invention will be described with reference to the accompanying drawings.

Figure 1:
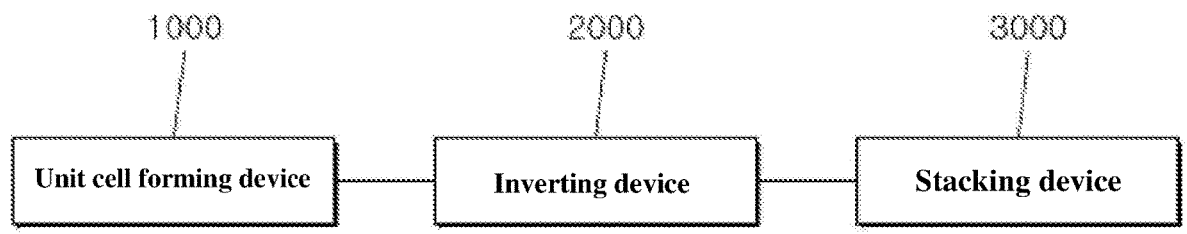
FIG. 1 is a block diagram showing a secondary battery manufacturing system for simplifying a process of manufacturing unit cells by laminating and a process of forming an electrode assembly using the unit cells according to an embodiment of the present invention.

As shown in FIG. 1, a secondary battery manufacturing system for simplifying a process of manufacturing unit cells by laminating and a process of forming an electrode assembly using the unit cells according to an embodiment of the present invention includes: a unit cell forming device 1000 for forming unit cells U1, in which a separator, an anode cell, a separator, a cathode cell, and a separator are stacked in order, from a separator roll R1, an anode cell roll R2, and a cathode cell roll R3, which are rolled; an inverting device 2000 for forming inverted unit cells U2, in which a separator, a cathode cell, a separator, an anode cell, and a separator are stacked in order, by inverting some of two or more unit cells U1 formed by the unit cell forming device 1000; and a stacking device 3000 for stacking a unit cell, an anode cell, an inverted unit cell, and a cathode cell in order.

The unit cell U1 has a structure of a unit full cell formed of a separator, an anode cell, a separator, a cathode cell, and a separator. The anode cell is an electrode having a negative polarity, coated with an anode material on both sides, and the cathode cell is an electrode having a positive polarity, coated with a cathode material on both sides. The inverted unit cell U2 has a structure of a unit full cell formed in order of a separator, a cathode cell, a separator, an anode cell, and a separator.

Figure 2:
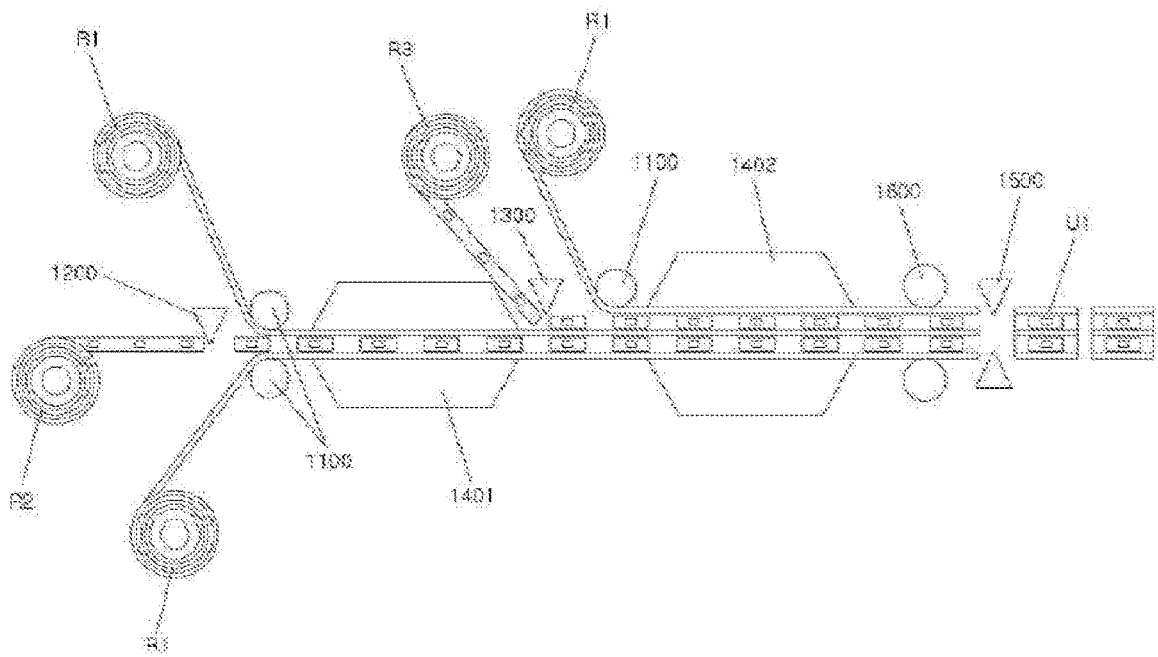
FIGS. 2 and 3 are exemplary views showing a unit cell forming device provided in the secondary battery manufacturing system for simplifying a process of manufacturing unit cells by laminating and a process of forming an electrode assembly using the unit cells of FIG. 1.

As shown in FIG. 2, the unit cell forming device 1000 includes: guides 1100 for guiding the separator, the anode cell and the cathode cell unrolled from the separator roll R1, the anode cell roll R2, and the cathode cell roll R3 to be overlapped; an anode cell cutter 1200 for forming one or more unit anode cells by dividing the anode cell in a unit size, and cutting the anode cell to be arranged at appropriate intervals; a cathode cell cutter 1300 for forming one or more unit cathode cells by dividing the cathode cell in a unit size, and cutting the cathode cell to be arranged at appropriate intervals; a first laminator 1401 and a second laminator 1402 for stacking and integrating the separator, the one or more unit anode cells arranged at appropriate intervals, the separator, the one or more unit cathode cells arranged at appropriate intervals, and the separator in order; and a unit cell cutter 1500 for cutting the separator, the one or more unit anode cells arranged at appropriate intervals, the separator, the one or more unit cathode cells arranged at appropriate intervals, and the separator integrated by the first laminator 1401 and the second laminator 1402 in a unit cell U1 size.

When it is determined that the tension is small as deflection occurs in the separator, the anode cell and the cathode cell unrolled from the separator roll R1, the anode cell roll R2 and the cathode cell roll R3, the guides 1100 compensate for the deflection of the separator, the anode cell and the cathode cell by moving up, down, left and right. A control unit or the like for controlling the operation of various sensors and the guides 1000 may be provided to sense the deflection.

In the first laminator 1401, a separator, one or more unit anode cells arranged at appropriate intervals, and a separator are stacked and integrated in order. In the second laminator 1402, one or more unit cathode cells arranged at appropriate intervals and a separator are stacked and integrated in order on the integrated separator, one or more unit anode cells arranged at appropriate intervals, and separator.

Figure 3:
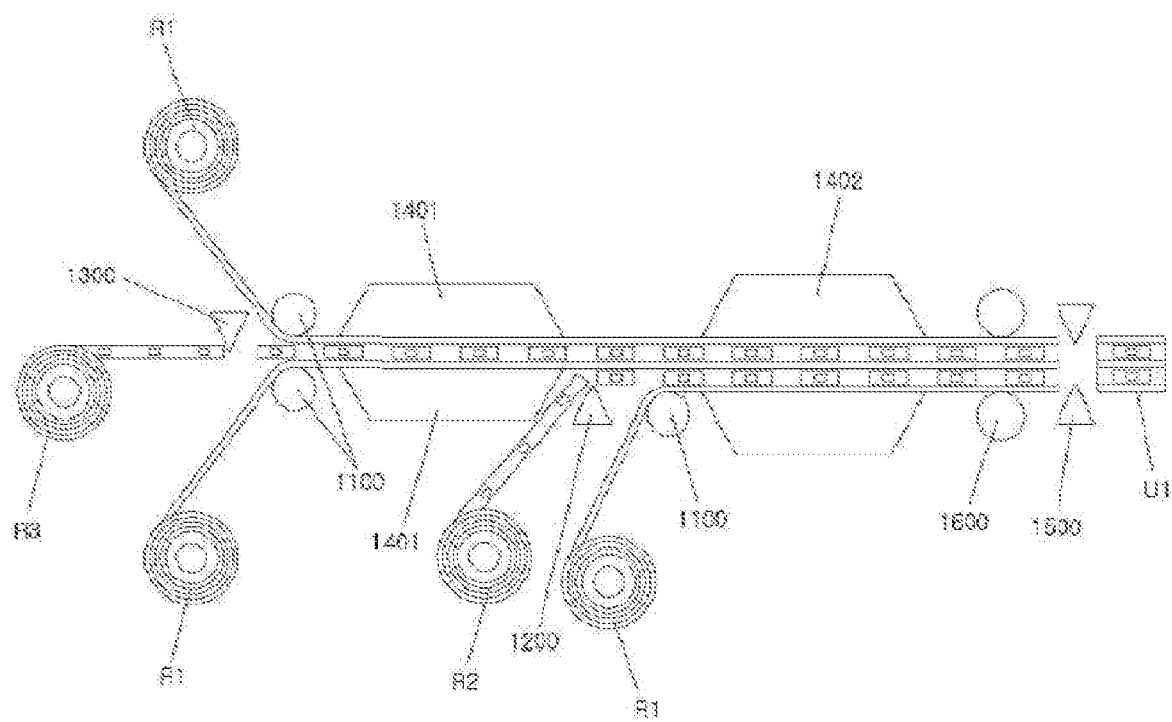

According to another embodiment, as shown in FIG. 3, in the first laminator 1401, a separator, one or more unit cathode cells arranged at appropriate intervals, and a separator are stacked and integrated in order. In the second laminator 1402, one or more unit anode cells arranged at appropriate intervals and a separator are stacked and integrated in order under the integrated separator, one or more unit cathode cells arranged at appropriate intervals, and separator.

Referring to FIG. 2 again, an adhesive is applied on the surface of the separator. The first laminator 1401 and the second laminator 1402 generate heat and pressure to integrate the separator, the one or more unit anode cells arranged at appropriate intervals, the separator, the one or more unit cathode cells arranged at appropriate intervals, and the separator.

An idle roller 1600 for guiding the integrated separator, one or more unit anode cells arranged at appropriate intervals, separator, one or more unit cathode cells arranged at appropriate intervals, and separator from the second laminator 1402 to the unit cell cutter 1500 is located between the second laminator 1402 and the unit cell cutter 1500. The unit cell cutter 1500 cuts gap portions, where a unit anode cell or a cathode cell does not exist, in the vertical direction. The unit cell cutter 1500 may be provided in a form having blades protruding from the top and the bottom.

Figure 4:
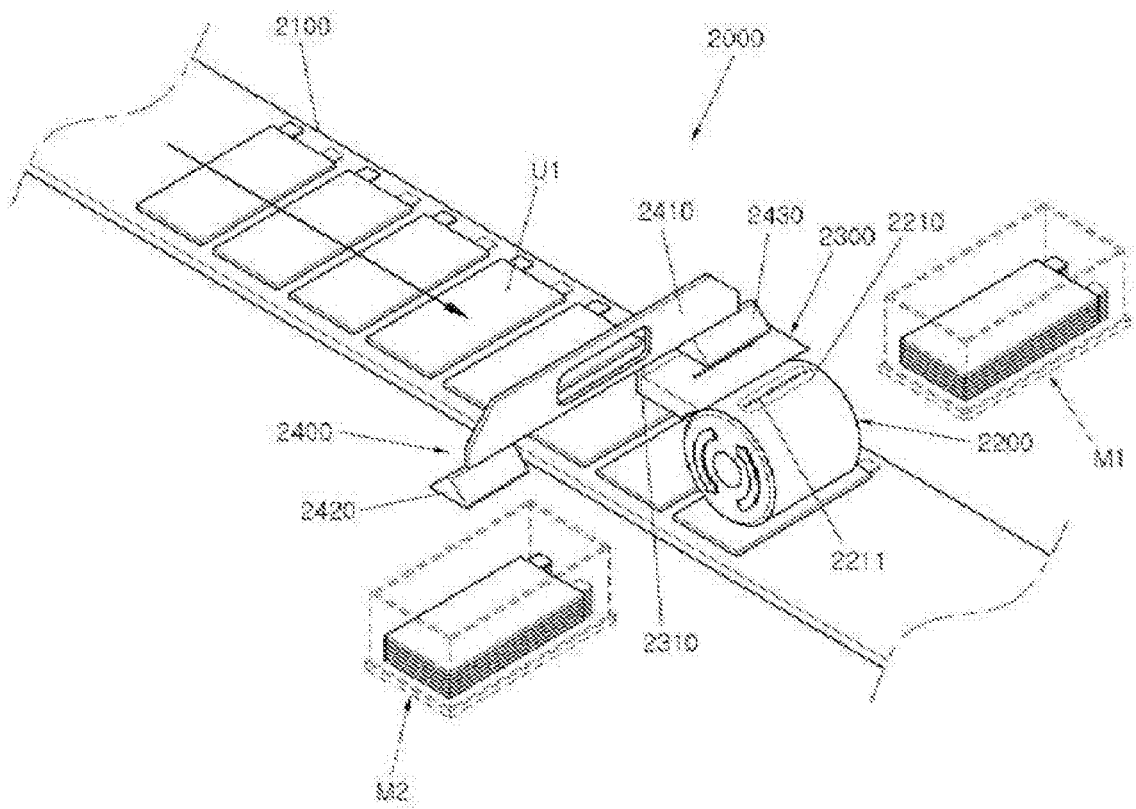
FIG. 4 is an exemplary view showing an inverting device provided in the secondary battery manufacturing system for simplifying a process of manufacturing unit cells by laminating and a process of forming an electrode assembly using the unit cells of FIG. 1.

As shown in FIG. 4, the inverting device 2000 includes: a conveyor belt 2100 continuously supplied with the unit cells U1 configuring a full cell; an adsorption drum 2200 located on the top surface of the conveyor belt 2100 to adsorb the unit cells U1; a table 2300 located at one side on the top of the adsorption drum 2200 to receive the unit cells U1 from the adsorption drum 2200 in an inverted state; and an upper carrier 2400 for receiving and moving the inverted unit cells U1 from the table 2300 to the magazines M1 and M2.

The adsorption drum 2200 is manufactured in the form of a cylinder. A rotation shaft is located at the center of the adsorption drum 2200. The rotation shaft receives rotating force from a gear box located on the side surface of the adsorption drum 2200. One or more intake pipes are embedded in the adsorption drum 2200. A suction unit 2210 having one or more suction holes 2211 formed in the width direction parallel to the rotation shaft of the adsorption drum 2200 is formed on the circumferential surface of the adsorption drum 2200. According to an embodiment, four suction units 2210 are formed on the circumferential surface of the adsorption drum 2200. The four suction units 2210 are arranged along the circumferential surface of the adsorption drum 2200 at the intervals of 90 degrees.

According to another embodiment, in addition to the suction unit 2210, the adsorption drum 2200 may be provided with a clamp or a hand for momentarily gripping both longitudinal ends of the unit cell U1. In addition, the adsorption drum 2200 may be manufactured in the form of a triangular prism or a square prism, not in the form of a cylinder. In particular, the rotation shaft may be eccentric and does not pass through the center of the adsorption drum 2200.

Meanwhile, an intake pipe is connected to each suction hole 2211 or connected to the suction unit 2210. One or more intake pipes are connected to a vacuum pump. Valves for adjusting the suction force of the unit cell U1 by the suction unit 2210 are mounted on one or more intake pipes. Operation of the valves is controlled by a control valve. The control valve controls operation of the valves so that the suction unit 2210 may adsorb the unit cell U1 or release adsorption of the unit cell U1 by logic, control map, formula or the like prepared in advance. In addition, rubber is applied on the rounded surface of the adsorption drum 2200. The unit cell U1 is pushed from the adsorption drum 2200 to the table 2300 as the unit cell U1 is rubbed with the rubber.

The table 2300 is a plate parallel to the ground. The table 2300 is provided with a block 2310 for limiting the position of the unit cell U1 on the top surface of the table 2300 as the block contacts with an end portion of the unit cell U1. The unit cell U1 is separated from the table 2300 and prevented from falling to the conveyor belt 2100 by the block 2310. According to another embodiment, a guide may be provided on the table 2300 to allow the unit cell U1 to be positioned at a right position.

The upper carrier 2400 includes a body unit 2410 parallel to the rotation shaft of the adsorption drum 2200 and located on the table 2300 to reciprocate in the longitudinal direction, and a first adsorption unit 2420 and a second adsorption unit 2430 disposed on both longitudinal sides of the body unit 2410.

The body unit 2410 is manufactured in the form of a beam. A hanging unit of a '¬' shape is provided on the body unit 2410, and a roller is provided in the hanging unit. The hanging unit is hung so that the roller is seated on a rail located on the top of the conveyor belt 2100. A motor is provided in the roller. The roller is rotated by the motor, and the body unit 2410 reciprocates in the longitudinal direction. The first adsorption unit 2420 and the second adsorption unit 2430 are connected to a vacuum pump. The inverted unit cells U1 are adsorbed by the suction force generated by the vacuum pump.

According to an embodiment, when the body unit 2410 reciprocates in the longitudinal direction, any one of the first adsorption unit 2420 and the second adsorption unit 2430 adsorbs the inverted unit cell U1 positioned on the table 2300, and another one of the first adsorption unit 2420 and the second adsorption unit 2430 transfers the inverted unit cell U1 to the magazine M1 or M2. That is, the first adsorption unit 2420 and the second adsorption unit 2430 sequentially adsorb inverted unit cells U1 and sequentially transfer the unit cells U1 to the magazines M1 and M2. The magazines M1 and M2 are arranged to be symmetrical to each other with respect to the conveyor belt 2100.

According to another embodiment, although the magazines M1 and M2 are separately disposed with intervention of the conveyor belt 2100, the height spaced apart from the ground or the separation distance from the conveyor belt 2100 may be different from each other.

Figure 5:
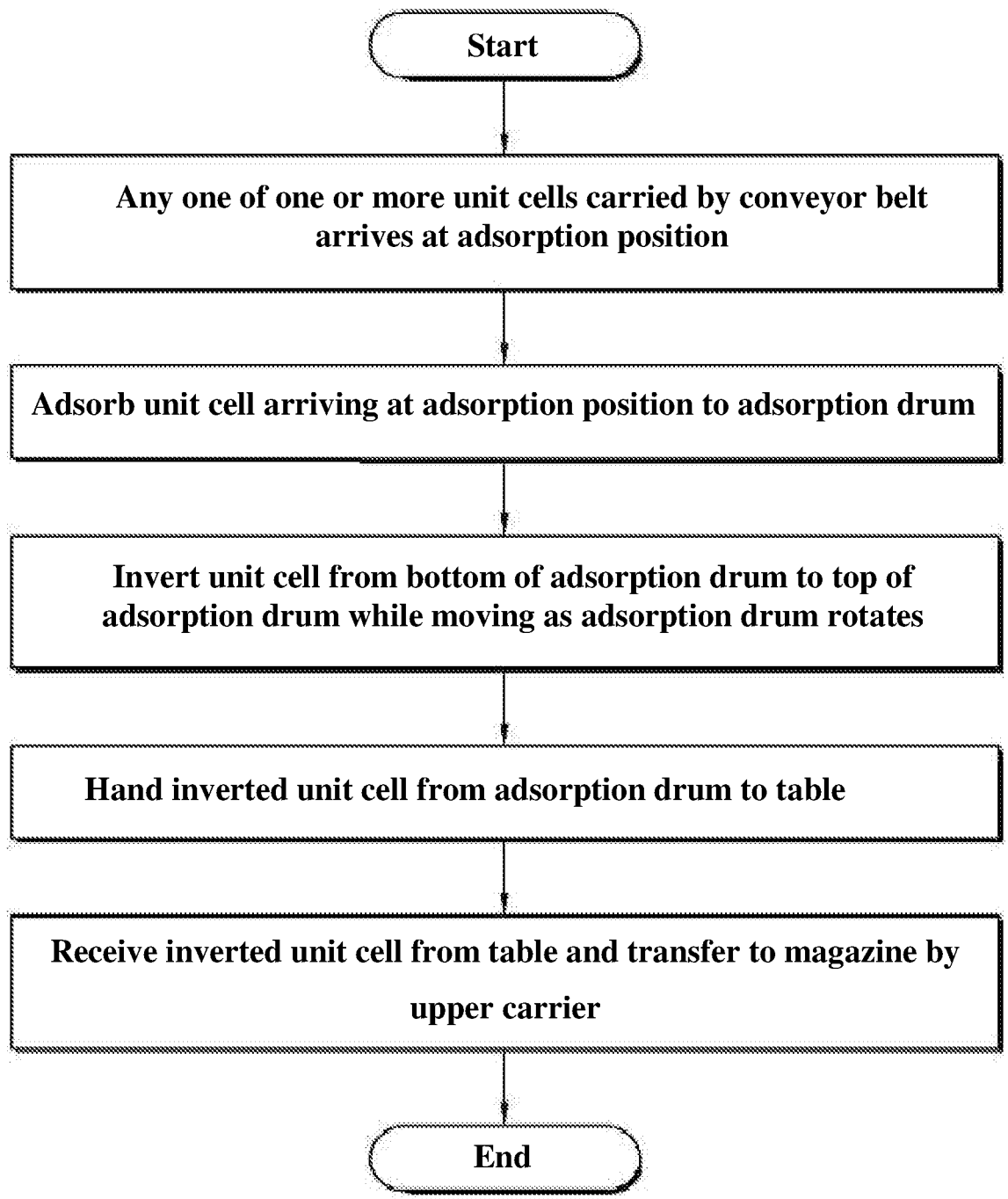
FIG. 5 is a flowchart illustrating the operation of the inverting device of FIG. 4.

FIG. 5 is a flowchart illustrating the operation of the inverting device 2000. FIGS. 6 to 12 are views showing the states of continuously inverting unit cells U1 according to the flowchart of FIG. 5.

As shown in FIGS. 5 to 12, the operation of the inverting device 2000 includes the steps of: arriving at an adsorption position, by any one of one or more unit cells U1 carried by the conveyor belt 2100; adsorbing the unit cell U1 arriving at the adsorption position, by the adsorption drum 2200; inverting the unit cell U1 adsorbed to the adsorption drum 2200 while moving from the bottom of the adsorption drum 2200 close to the conveyor belt 2100 to the top of the adsorption drum 2200 close to the upper carrier 2400 according to rotation of the adsorption drum 2200; transferring the unit cell U1 from the adsorption drum 2200 to the table 2300 while the unit cell U1 is inverted; and receiving and transferring the inverted unit cell U1 from the table 2300 to the magazine M1 or M2, by the upper carrier 2400.

Figure 6:
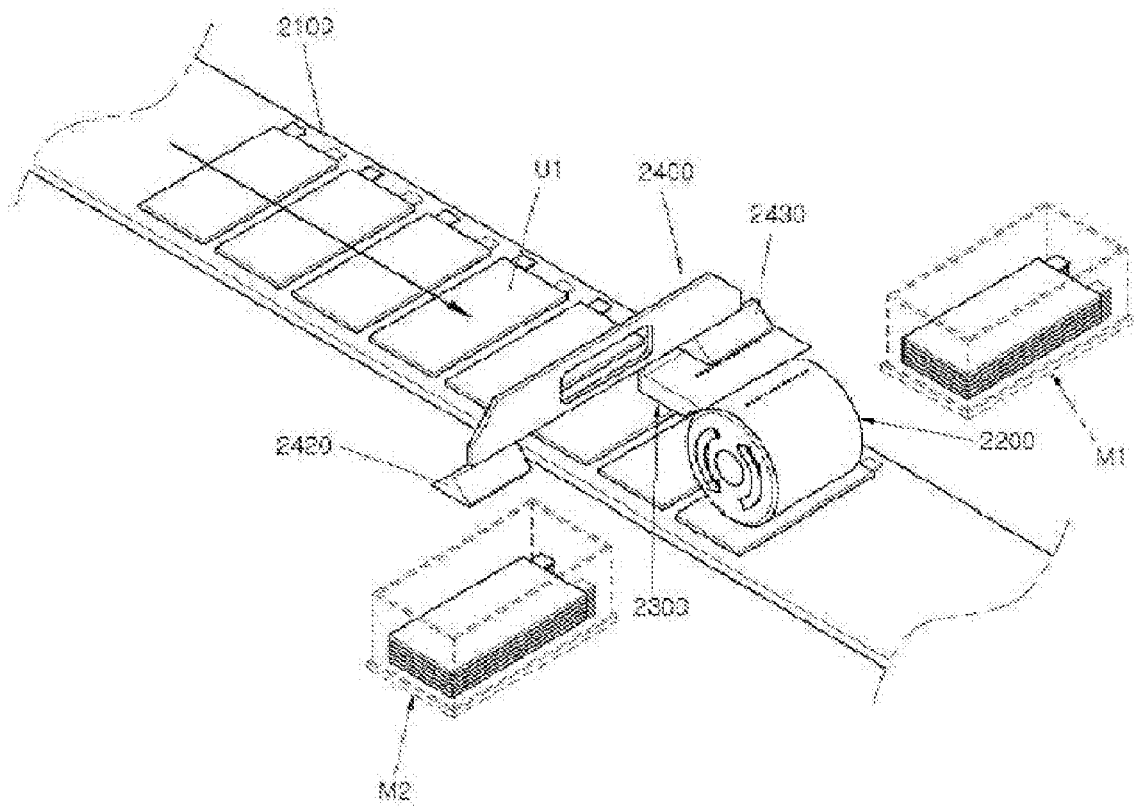
FIGS. 6 to 12 are views showing the states of continuously inverting unit cells according to the flowchart of FIG. 5.

As shown in FIG. 6, any one of the one or more unit cells U1 carried by the conveyor belt 2100 is adsorbed to the adsorption drum 2200 through the step of arriving at an adsorption position and the adsorbing step.

Figure 7:
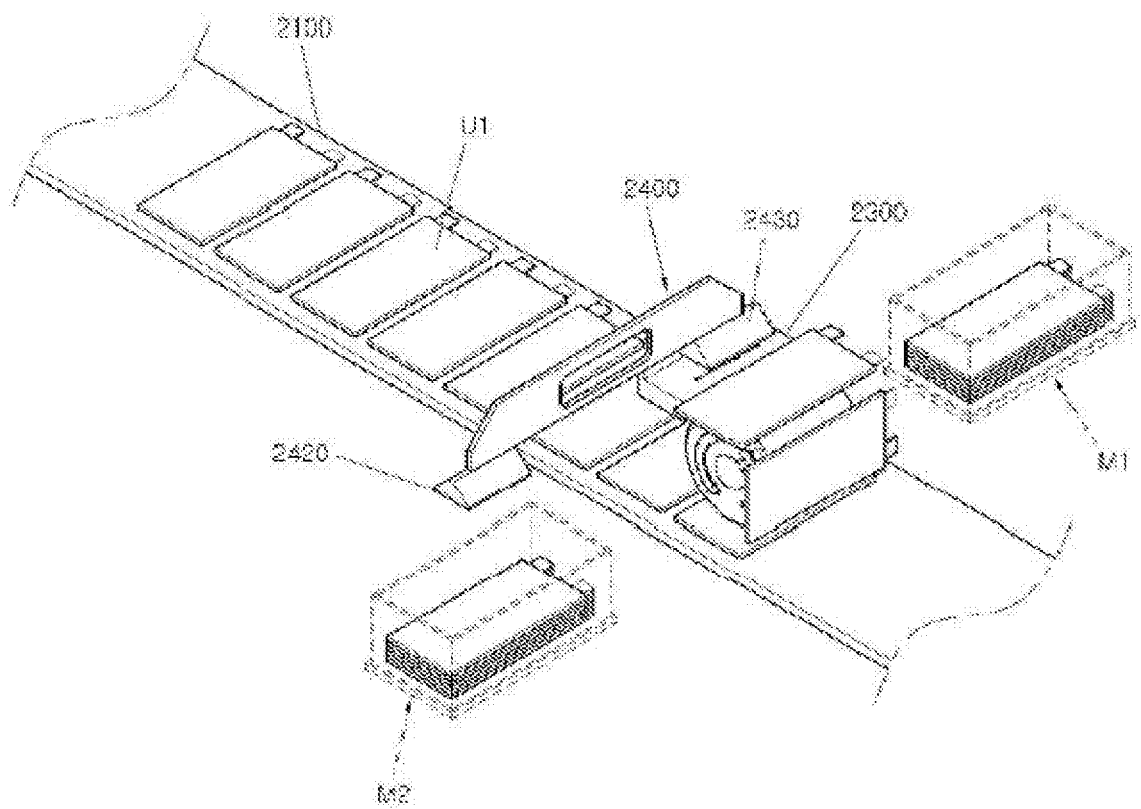

As shown in FIG. 7, at the step of moving and inverting the unit cell U1, the unit cell U1 adsorbed to the adsorption drum 2200 as the adsorption drum 2200 rotates is moved from the bottom of the adsorption drum 2200 to the top of the adsorption drum 2200. At this point, another unit cell U1 arriving at the adsorption position is adsorbed to the adsorption drum 2200.

Figure 8:
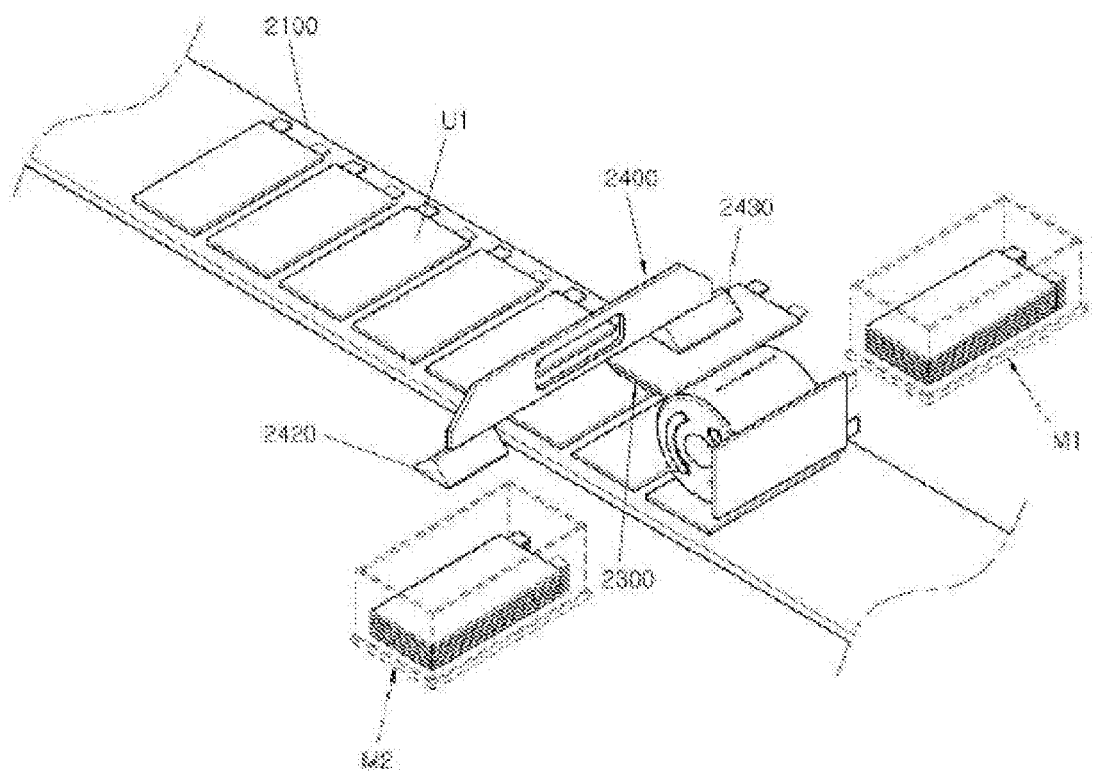
Figure 9:
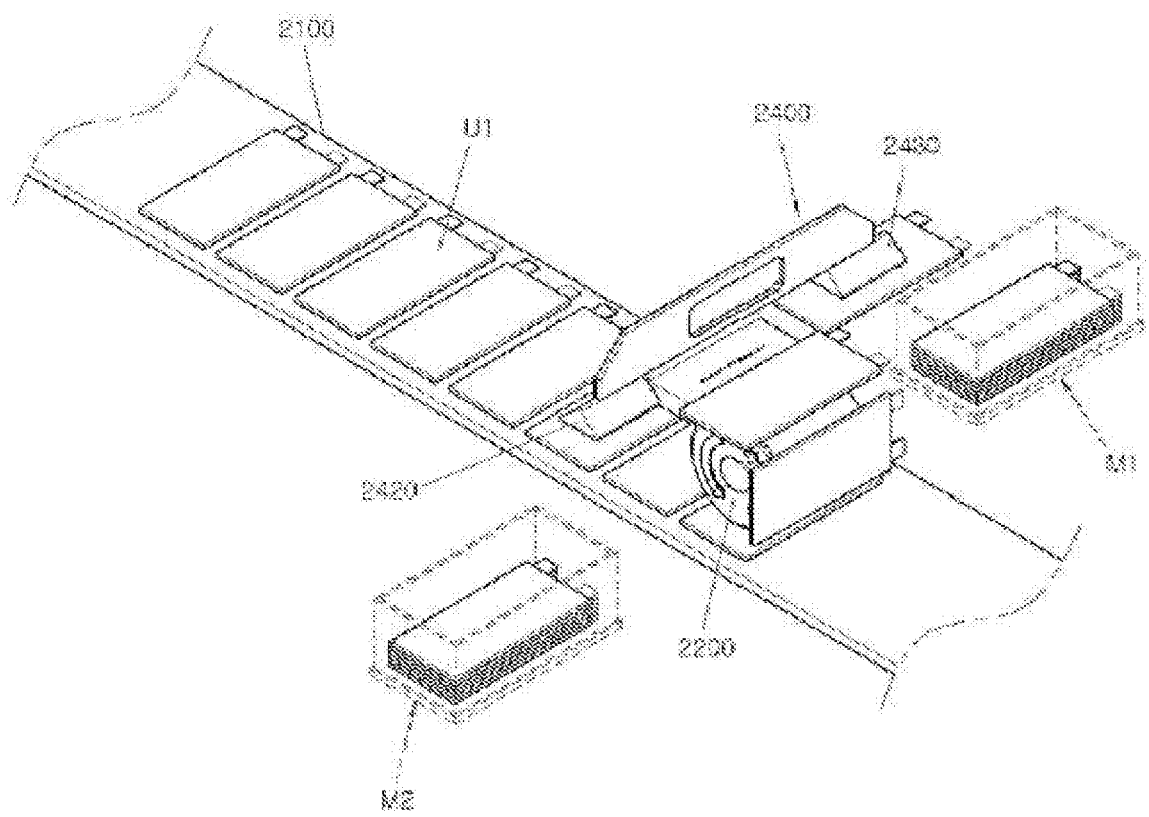

As shown in FIGS. 8 and 9, at the step of receiving and transferring the inverted unit cell U1 from the table 2300 to the magazine M1 or M2 by the upper carrier 2400, the upper carrier 2400 moves in the longitudinal direction, after the first adsorption unit 2420 provided at one longitudinal side adsorbs the inverted unit cell U1, so that the first adsorption unit 2420 may arrive at the magazine M1 or M2. When the first adsorption part 2420 moves in the longitudinal direction to arrive at the magazine M1 or M2, another unit cell U1 is inverted while moving from the bottom of the adsorption drum 2200 to the top of the adsorption drum 2200, and is transferred from the adsorption drum 2200 to the table 2300.

Figure 10:
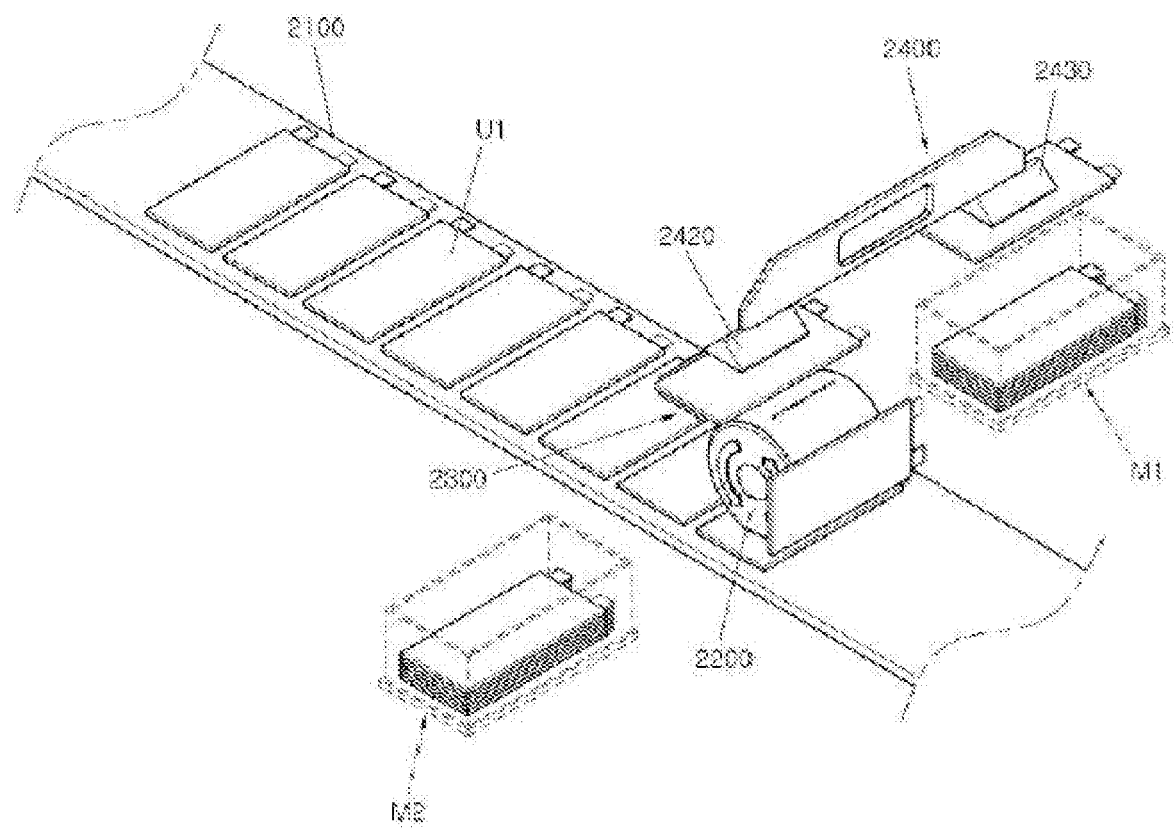
Figure 11:
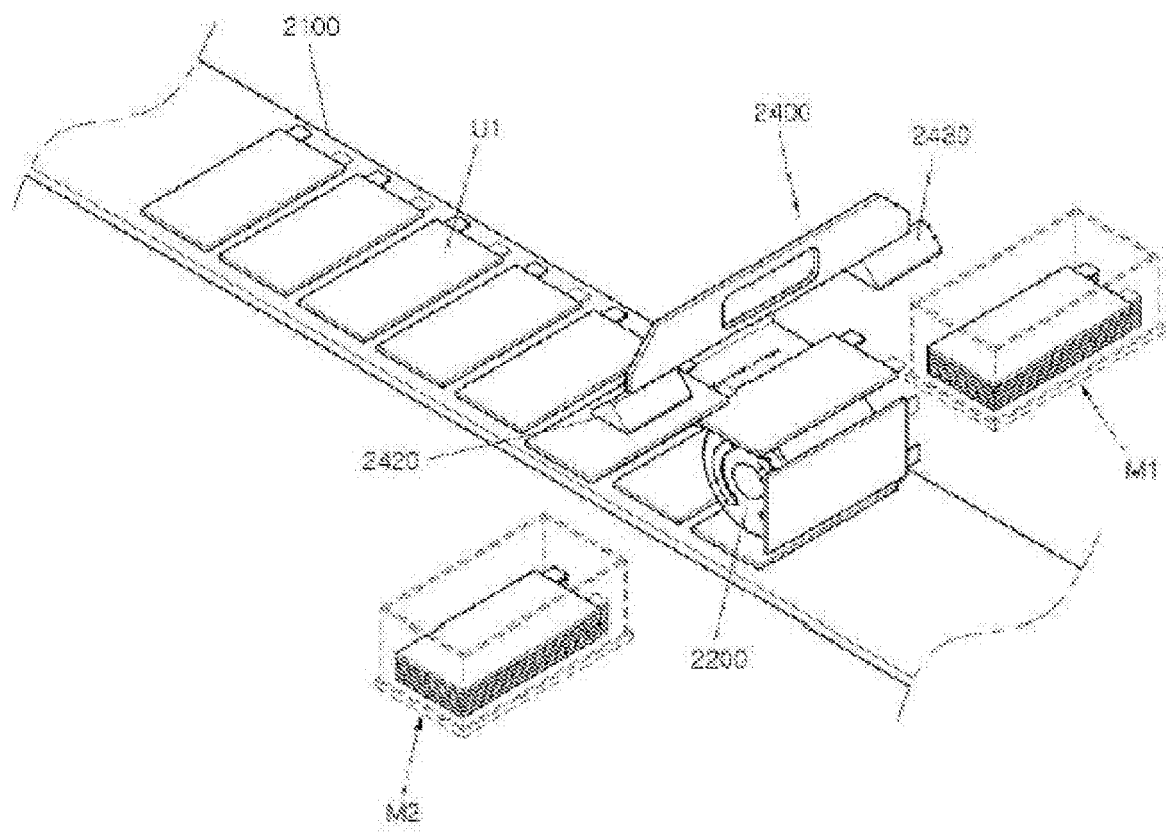

As shown in FIG. 10, when the first adsorption unit 2420 arrives at the magazine M1 or M2, the second adsorption unit 2430 adsorbs another unit cell U1 that is inverted. After the second adsorption unit 2430 adsorbs another unit cell U1 and the first adsorption unit 2420 transfers the unit cell U1 to the magazine M1 or M2, the upper carrier 2400 moves in the longitudinal direction as shown in FIG. 10 so that the second adsorption unit 2430 may move toward the other magazine M1 or M2 arranged to be symmetrical to the magazine M1 or M2 with respect to the conveyor belt 2100. At this point, as the adsorption drum 2200 rotates, another inverted unit cell U1 adsorbed to the adsorption drum 2200 is inverted while moving from the bottom of the adsorption drum 2200 to the top of the adsorption drum 2200, and is transferred from the adsorption drum 2200 to the table 2300.

Figure 12:
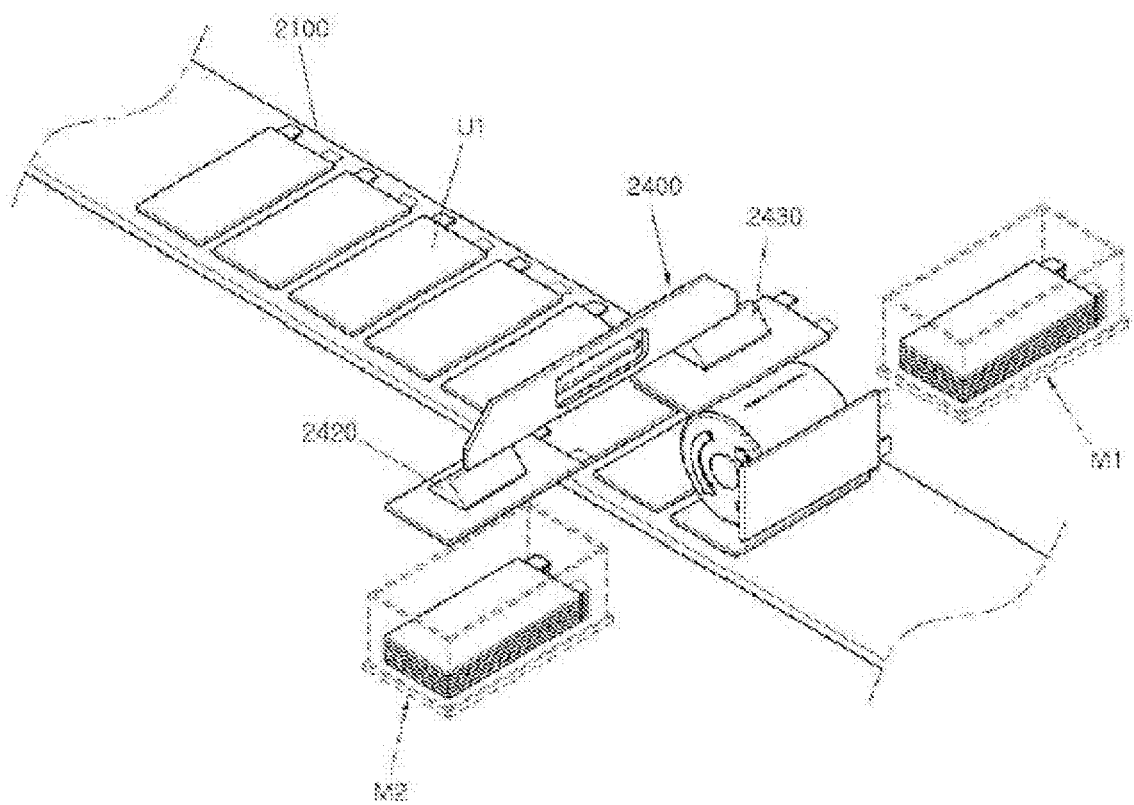

As shown in FIG. 12, when the second adsorption unit 2430 arrives at the other magazine M1 or M2, the first adsorption unit 2420 adsorbs another inverted unit cell U1 positioned on the table 2300.

As described above, the adsorption drum 2200 repeatedly adsorbs and inverts unit cells U1 while rotating, and transfers the inverted unit cells U1 to the table 2300. The upper carrier 2400 moves the inverted unit cell U1 positioned on the table 2300 to any one of the two magazines M1 and M2, and transfers the inverted unit cell U1 to one of the magazines M1 and M2 while repeatedly reciprocating in the longitudinal direction.

Therefore, according to the inverting device 2000 of an embodiment of the present invention configured as described above, since a unit cell U1 adsorbed to the adsorption drum 2200 is inverted while moving from the bottom of the adsorption drum 2200 to the top of the adsorption drum 2200, the unit cells U1 can be easily inverted.

Particularly, since inverted unit cells U1 are successively stacked on the magazines M1 and M2, preparation of the inverted unit cells U1 for manufacturing a secondary battery is convenient.

Figure 13:
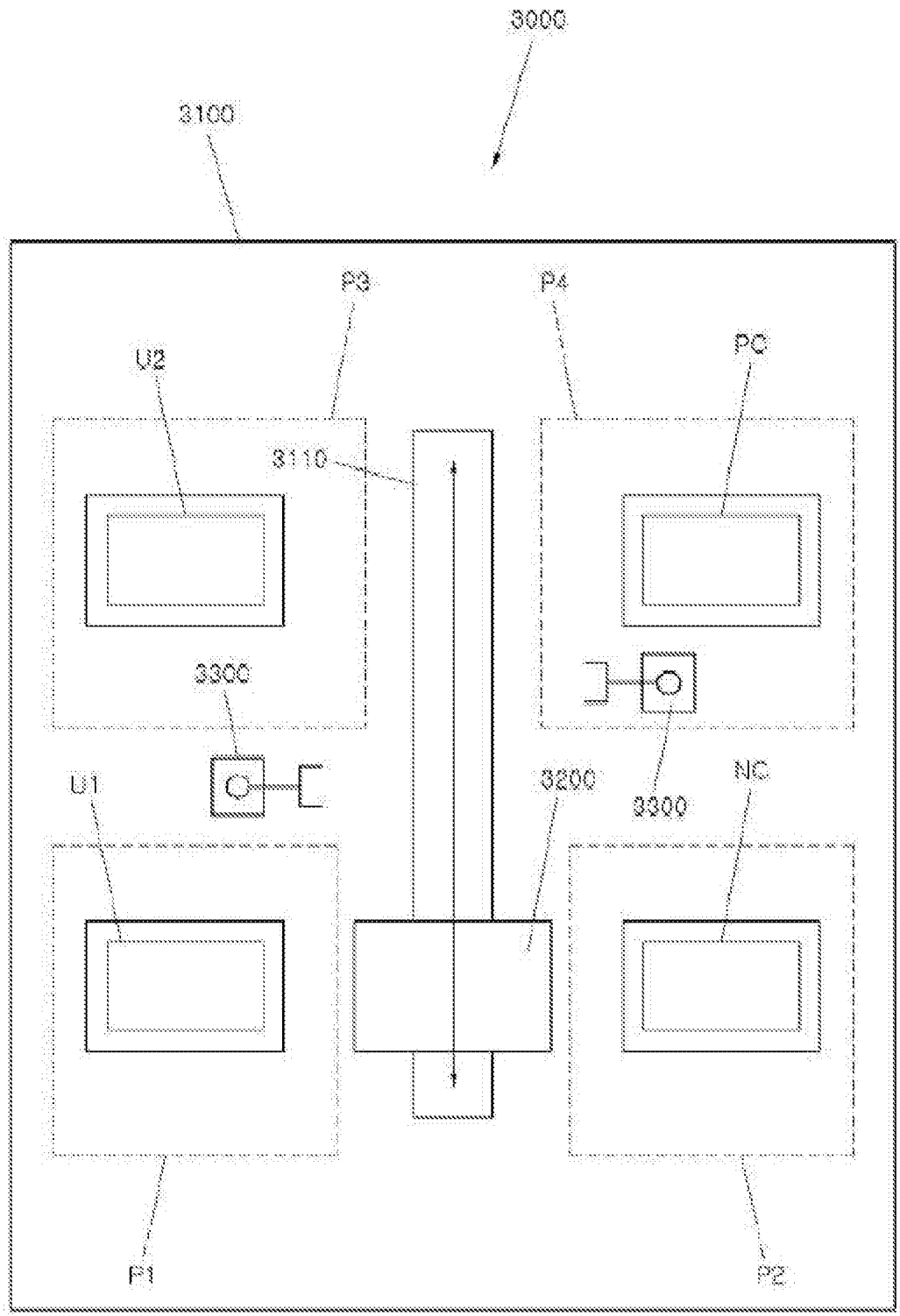
FIGS. 13 and 14 are exemplary views showing a stacking device provided in the secondary battery manufacturing system for simplifying a process of manufacturing unit cells by laminating and a process of forming an electrode assembly using the unit cells of FIG. 1.

As shown in FIG. 13, the stacking device 3000 includes: a floor 3100 for preparing a unit cell U1 at a first position P1, an anode cell NC at a second position P2 to face the unit cell U1, an inverted unit cell U2 at a third position P3, and a cathode cell PC at a fourth position P4 to face the inverted unit cell U2; a stage 3200 reciprocating between the unit cell U1 and the anode cell NC and between the inverted unit cell U2 and the cathode cell PC; and one or more robot arms 3300 for stacking a unit cell, an anode cell, an inverted unit cell, and a cathode cell prepared at the first position P1 to the fourth position P4 in order on the stage 3200.

The first position P1 and the third position P3 are located on one side of a path 3110 along which the stage 3200 moves, and the second position P2 and the fourth position P4 are located on the other side of the path 3110 that is formed on the floor 3100 so that the stage 3200 may move.

Figure 14:
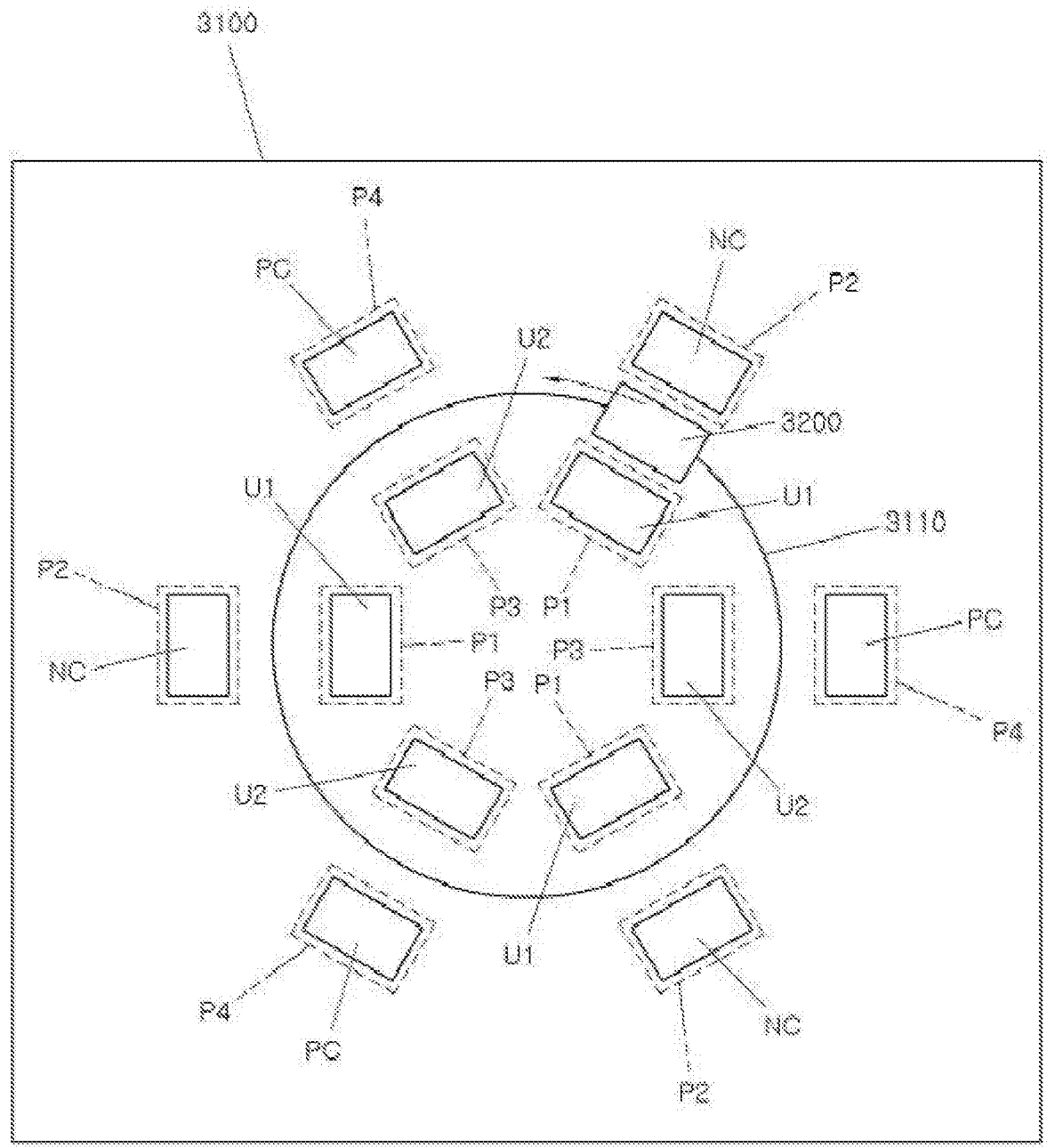

The path 3110 is formed on the floor 3100 in the form of a straight line, a curved line, an ellipse or a circle. The first position P1, the second position P2, the third position P3 and the fourth position P4 are arranged to be perpendicular to the path 3110. As shown in FIG. 12, when the path 3110 is a straight line, the stage 3200 reciprocates between the first position P1 and the second position P2 and between the third position P3 and the fourth position P4 while moving forward or backward. As shown in FIG. 14, when the path 3110 is a rotation path of an ellipse or a circle, the first position P1 and the second position P2, and the third position P3 and the fourth position P4 are repeatedly formed, and the stage 3200 moves only in a specific direction along the circumference.

Figure 15:
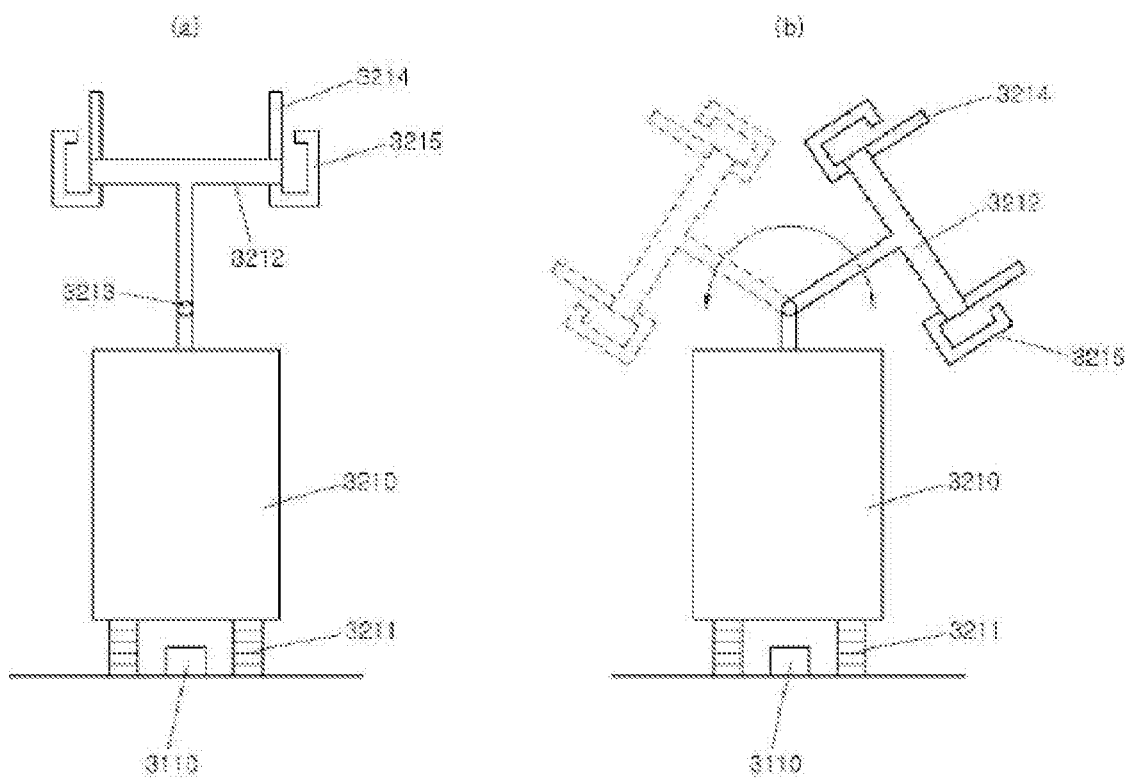
FIG. 15 is an exemplary view showing a stage provided in the stacking device of FIG. 13.

FIG. 15 is an exemplary view showing the stage 3200. As shown in FIG. 15, the stage 3200 is manufactured to be alternately tilted at a predetermined angle toward the first position P1, the second position P2, the third position P3, and the fourth position P4. The stage 3200 includes a body unit 3210 moving along the path 3110, and a tilting seat unit 3212 positioned on the top surface of the body unit 3210 and tilted left or right around a hinge 3213 parallel to the ground.

A wheel 3211 driven along the path 3110 and a driver for rotating the wheel 3211 are mounted on the body unit 3210. The tilting seat unit 3212 is provided with a guide 3214 for seating a unit cell U1, an inverted unit cell U2, an anode cell NC and a cathode cell PC at right positions. The tilting seat unit 3212 is provided with a clamping unit 3215 for fixing the unit cell U1, the inverted unit cell U2, the anode cell NC, and the cathode cell PC seated on the tilting seat unit 3212.

Referring to FIG. 13 again, stacking the unit cell U1, the anode cell NC, the inverted unit cell U2, and the cathode cell PC on the stage 3200 is accomplished by the robot arms 3300. The robot arms 3300 may be disposed at one side of the first position P1, the second position P2, the third position P3 and the fourth position P4, respectively. According to another example, the robot arms 3300 may be disposed between the first position P1 and the third position P3 and between the second position P2 and the fourth position P4, respectively. In this case, the robot arms 3300 may move any one among the unit cell U1, the anode cell NC, the inverted unit cell U2, and the cathode cell PC to the stage 3200 while moving between the first position P1 and the third position P3 and between the second position P2 and the fourth position P4. When the path 3110 is a rotation path, the robot arm 3300 may be mounted on the stage 3200.

According to the secondary battery manufacturing system for simplifying a process of manufacturing unit cells by laminating and a process of forming an electrode assembly using the unit cells according to an embodiment of the present invention configured as described above, the process of manufacturing an electrode assembly is simplified, and the defect rate of the manufactured electrode assembly is lowered.

Particularly, since the unit cells U1 are manufactured through laminating, manufacturing the unit cells U1 is easy. In addition, since a method of alternately stacking the unit cells U1 and electrode cells manufactured by laminating is selected as a method of forming an electrode assembly, the process of preparing the unit cells U1 and the electrode cells is simple, and the frequency of rework can be remarkably reduced as defective electrodes are removed in advance in a corresponding preparation process. In addition, the unit cells U1 and the electrode cells can be seated at right positions through the tilted stage 3200 and the robot arms 3300. Ultimately, the defect rate of the electrode assembly can be lowered.

According to the secondary battery manufacturing system for simplifying a process of manufacturing unit cells by laminating and a process of forming an electrode assembly using the unit cells according to an embodiment of the present invention configured as described above, the process of manufacturing an electrode assembly is simplified, and the defect rate of the manufactured electrode assembly is lowered.

Particularly, since the unit cells are manufactured through laminating, manufacturing the unit cells is easy. In addition, since a method of alternately stacking the unit cells and electrode cells manufactured by laminating is selected as a method of forming an electrode assembly, the process of preparing the unit cells and the electrode cells is simple, and the frequency of rework can be remarkably lowered as defective electrodes are removed in advance in a corresponding preparation process.

In addition, the unit cells and the electrode cells can be seated at right positions through the tilted stage and the robot arms. Ultimately, the defect rate of the electrode assembly can be lowered.

What is claimed is:

1. A secondary battery manufacturing system for simplifying a process of manufacturing unit cells by laminating and a process of forming an electrode assembly using the unit cells, the system comprising:
   a unit cell forming device for the forming unit cells, in which a separator, an anode cell, a separator, a cathode cell, and a separator are stacked in order, from a separator roll, an anode cell roll, and a cathode cell roll, which are rolled;
   an inverting device for forming inverted unit cells, in which a separator, a cathode cell, a separator, an anode cell, and a separator are stacked in order, by inverting some of two or more unit cells formed by the unit cell forming device; and
   a stacking device for stacking a unit cell, an anode cell, an inverted unit cell, and a cathode cell in order, wherein
   the unit cell forming device forms the unit cells by stacking and integrating a separator, an anode cell, and a separator in order, and then stacking and integrating a cathode cell and a separator thereon, and
   the stacking device includes:
   a floor for preparing the unit cell at a first position, the anode cell at a second position to face the unit cell, the inverted unit cell at a third position, and the cathode cell at a fourth position to face the inverted unit cell;

a stage reciprocating between the unit cell and the anode cell and between the inverted unit cell and the cathode cell; and one or more robot arms for stacking a unit cell, an anode cell, an inverted unit cell, and a cathode cell prepared at the first position to the fourth position in order on the stage.

2. A secondary battery manufacturing system for simplifying a process of manufacturing unit cells by laminating and a process of forming an electrode assembly using the unit cells, the system comprising:

a unit cell forming device for the forming unit cells, in which a separator, an anode cell, a separator, a cathode cell, and a separator are stacked in order, from a separator roll, an anode cell roll, and a cathode cell roll, which are rolled;

an inverting device for forming inverted unit cells, in which a separator, a cathode cell, a separator, an anode cell, and a separator are stacked in order, by inverting some of two or more unit cells formed by the unit cell forming device; and a stacking device for stacking a unit cell, an anode cell, an inverted unit cell, and a cathode cell in order, wherein the unit cell forming device forms the unit cells by stacking and integrating a separator, a cathode cell, and a separator in order, and then stacking and integrating an anode cell and a separator below, and the stacking device includes:

a floor for preparing the unit cell at a first position, the anode cell at a second position to face the unit cell, the inverted unit cell at a third position, and the cathode cell at a fourth position to face the inverted unit cell;

a stage reciprocating between the unit cell and the anode cell and between the inverted unit cell and the cathode cell; and one or more robot arms for stacking a unit cell, an anode cell, an inverted unit cell, and a cathode cell prepared at the first position to the fourth position in order on the stage.

3. The system according to claim 1, wherein the unit cell forming device includes:

guides for guiding the separator, the anode cell and the cathode cell unrolled from the separator roll, the anode cell roll, and the cathode cell roll to be overlapped;

an anode cell cutter for forming unit anode cells by dividing the anode cell in a unit size, and cutting the anode cell to be arranged at appropriate intervals;

a cathode cell cutter for forming unit cathode cells by dividing the cathode cell in a unit size, and cutting the cathode cell to be arranged at appropriate intervals;

a first laminator and a second laminator for stacking and integrating the separator, the unit anode cells arranged at appropriate intervals, the separator, the unit cathode cells arranged at appropriate intervals, and the separator in order; and a unit cell cutter for cutting the separator, the unit anode cells arranged at appropriate intervals, the separator, the unit cathode cells arranged at appropriate intervals, and the separator integrated by the first laminator and the second laminator in a unit cell size.

4. The system according to claim 3, wherein an idle roller for guiding the integrated separator, unit anode cells arranged at appropriate intervals, separator, unit cathode cells arranged at appropriate intervals, and separator from the second laminator to the unit cell cutter is located between the second laminator and the unit cell cutter.

5. The system according to claim 1, wherein the inverting device includes:

a conveyor belt continuously supplied with the unit cells;

an adsorption drum located on a top surface of the conveyor belt to adsorb the unit cells;

a table located at one side on a top of the adsorption drum to receive the unit cells from the adsorption drum in an inverted state; and an upper carrier for receiving and moving the inverted unit cells from the table to magazines.

6. The system according to claim 5, wherein a suction unit having one or more suction holes formed in a longitudinal direction parallel to a rotation shaft of the adsorption drum is formed on a circumferential surface of the adsorption drum.

7. The system according to claim 5, wherein the table is provided with a block for limiting a position of the unit cell on a top surface of the table as the block contacts with an end portion of the unit cell.

8. The system according to claim 5, wherein the upper carrier includes:

a body unit parallel to a rotation shaft of the adsorption drum and located on the table to reciprocate in the longitudinal direction; and a first adsorption unit and a second adsorption unit disposed on both longitudinal sides of the body unit.

9. The system according to claim 8, wherein when the body unit reciprocates in the longitudinal direction, any one of the first adsorption unit and the second adsorption unit adsorbs the inverted unit cell positioned on the table, and another one of the first adsorption unit and the second adsorption unit transfers the inverted unit cell to the magazine.

10. The system according to claim 1, wherein the stage can be alternately tilted at a predetermined angle toward the first position, the second position, the third position, and the fourth position.

11. The system according to claim 1, wherein the first position and the third position are located on one side of a path along which the stage moves, and the second position and the fourth position are located on the other side of the path along which the stage moves.

12. The system according to claim 1, wherein the robot arms are positioned between the first position and the third position and between the second position and the fourth position, respectively.

13. The system according to claim 2, wherein the unit cell forming device includes:

guides for guiding the separator, the anode cell and the cathode cell unrolled from the separator roll, the anode cell roll, and the cathode cell roll to be overlapped;

an anode cell cutter for forming unit anode cells by dividing the anode cell in a unit size, and cutting the anode cell to be arranged at appropriate intervals;

a cathode cell cutter for forming unit cathode cells by dividing the cathode cell in a unit size, and cutting the cathode cell to be arranged at appropriate intervals;

a first laminator and a second laminator for stacking and integrating the separator, the unit anode cells arranged at appropriate intervals, the separator, the unit cathode cells arranged at appropriate intervals, and the separator in order; and a unit cell cutter for cutting the separator, the unit anode cells arranged at appropriate intervals, the separator, the unit cathode cells arranged at appropriate intervals, and the separator integrated by the first laminator and the second laminator in a unit cell size.

14. The system according to claim 13, wherein an idle roller for guiding the integrated separator, unit anode cells arranged at appropriate intervals, separator, unit cathode cells arranged at appropriate intervals, and separator from the second laminator to the unit cell cutter is located between the second laminator and the unit cell cutter.

15. The system according to claim 2, wherein the inverting device includes:
- a conveyor belt continuously supplied with the unit cells;
- an adsorption drum located on a top surface of the conveyor belt to adsorb the unit cells;
- a table located at one side on a top of the adsorption drum to receive the unit cells from the adsorption drum in an inverted state; and
- an upper carrier for receiving and moving the inverted unit cells from the table to magazines.

16. The system according to claim 15, wherein a suction unit having one or more suction holes formed in a longitudinal direction parallel to a rotation shaft of the adsorption drum is formed on a circumferential surface of the adsorption drum.

17. The system according to claim 15, wherein the table is provided with a block for limiting a position of the unit cell on a top surface of the table as the block contacts with an end portion of the unit cell.

18. The system according to claim 2, wherein the stage can be alternately tilted at a predetermined angle toward the first position, the second position, the third position, and the fourth position.

19. The system according to claim 2, wherein the first position and the third position are located on one side of a path along which the stage moves, and the second position and the fourth position are located on the other side of the path along which the stage moves.

20. The system according to claim 2, wherein the robot arms are positioned between the first position and the third position and between the second position and the fourth position, respectively.

* * * * *